(12) United States Patent
Lee et al.

(10) Patent No.: US 9,201,459 B2
(45) Date of Patent: Dec. 1, 2015

(54) PORTABLE TERMINAL

(71) Applicant: Pantech Co., Ltd., Seoul (KR)

(72) Inventors: Yung Wook Lee, Seoul (KR); Sung Pil Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 14/108,919

(22) Filed: Dec. 17, 2013

(65) Prior Publication Data
US 2014/0177154 A1  Jun. 26, 2014

(30) Foreign Application Priority Data
Dec. 20, 1920  (KR) .................. 10-2012-0149485

(51) Int. Cl.
*G06F 1/16*  (2006.01)

(52) U.S. Cl.
CPC ............ *G06F 1/1637* (2013.01); *G06F 1/1656* (2013.01)

(58) Field of Classification Search
CPC ... G06F 1/1626; G06F 1/1656; G06F 1/1613; G06F 1/1601; G06F 1/1637; G06F 1/1643; H05K 1/0281; H05K 5/06; H05K 1/118; H05K 1/147; H05K 1/028; H05K 2201/10053; H05K 7/20972
USPC ............ 361/679.01, 679.02, 679.08, 679.09, 361/679.26, 679.27; 349/58–60; 248/917–924
See application file for complete search history.

(56) References Cited

U.S. PATENT DOCUMENTS

| | | | |
|---|---|---|---|
| 5,383,312 A * | 1/1995 | St. Louis et al. ................ 52/63 |
| 2011/0012852 A1* | 1/2011 | Takahashi .................... 345/173 |
| 2012/0162880 A1* | 6/2012 | Yoon et al. ............... 361/679.01 |

FOREIGN PATENT DOCUMENTS

KR  10-2008-0029785  4/2008

* cited by examiner

*Primary Examiner* — Anthony Haughton
*Assistant Examiner* — Ingrid Wright
(74) *Attorney, Agent, or Firm* — H.C. Park & Associates, PLC

(57) ABSTRACT

Provided is a portable terminal, including: a window module; a display module disposed below the window module; a housing partially surrounding the window module and the display module; and a waterproof portion disposed on at least one of a bottom surface and a side surface of the display module to impede liquids from penetrating between the display module and the housing.

20 Claims, 5 Drawing Sheets

PORTABLE TERMINAL

CROSS-REFERENCE TO RELATED APPLICATION

This application claims priority to and the benefit under 35 U.S.C. §119(a) of Korean Patent Application No. 10-2012-0149485, filed on Dec. 20, 2012, the entire disclosure of which is incorporated by reference for all purposes.

BACKGROUND

1. Field

The following disclosure relates to a portable terminal, and more particularly, to a portable terminal that reduces a size of a bezel portion and may impede liquids from entering into various portions of the portable terminal.

2. Discussion of the Background

With rapid development in science and information technology (IT), various types of portable terminals, such as a personal digital assistant (PDA), a netbook, a notebook, and a mobile Internet device, for example, have been manufactured to have a small size and multiple functions.

Regarding a smartphone among such portable terminals, an active area of a touch window is increasing and a width of a frame, that is, a bezel portion surrounding the touch window from all sides, is decreasing. Research on decreasing thickness of the smartphone is also actively conducted.

Figure 1:
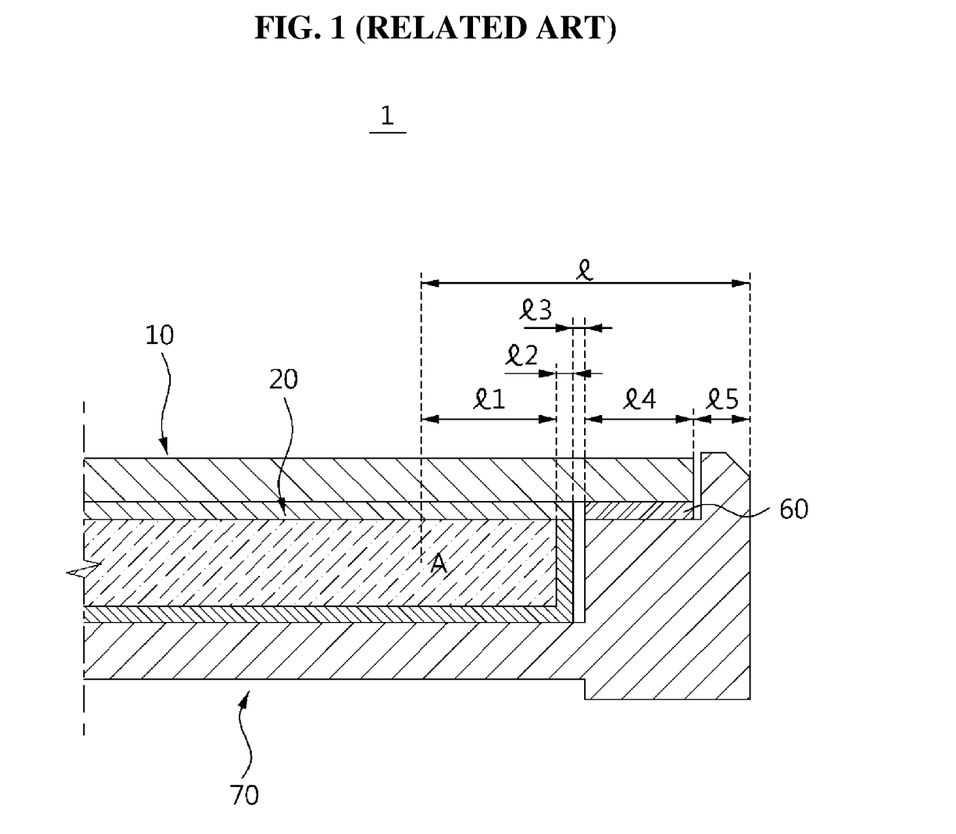
FIG. 1 is a cross-sectional view illustrating a portion of a portable terminal according to a related art.

FIG. 1 is a cross-sectional view of a portion of a portable terminal according to a related art.

Referring to FIG. 1, a portable terminal 1 includes a liquid crystal display (LCD) module 20 in which a touch layer and an LCD layer are combined below a window glass 10, and has a structure in which the window glass 10 is combined with a housing 70 by attaching an adhesive tape 60 to a bottom surface of a portion of the window glass 10 not overlapping the LCD module 20. Here, the adhesive tape 60 may perform waterproof functionality of preventing external liquid and the like from penetrating into a portion in which the window glass 10 and the LCD module 20 are disposed.

In the portable terminal 1, it is not easy to decrease an attachment area of the adhesive tape 60 and thus, there are some constraints in further decreasing a length of a bezel portion, which is indicated using "l" in FIG. 1. A width of an adhesive tape being currently used corresponds to a minimized width.

Hereinafter, a bezel portion of the portable terminal 1 will be described with reference to FIG. 1. For example, the bezel portion may have a length of 4.1 mm that is a sum of 1.2 mm, which refers to a length l1 from an active area A of the LCD module 20 to an edge portion of an LCD panel, 0.2 mm, which refers to a length l2 of the LCD frame, 0.2 mm refers to a length l3 from an outer edge of the LCD frame to an interior surface of the housing 70, 1.5 mm, which refers to a length l4 of the adhesive tape 60, and 1 mm, which refers to a length l5 from an end of the adhesive tape 60 to an outer surface of the housing 70. A minimum width of the adhesive tape 60 provides a determined minimum protection against liquids from entering into the potable terminal 1 and thus, it may not be easy to reduce the length of the bezel portion.

Referring to FIG. 1, the window module 10 and the housing 70 are combined with the adhesive tape 60 to provide protection against liquids. Accordingly, in the related art, a length of a bezel portion is increased and thus, some constraints in minimizing the length of the bezel portion of the portable terminal 1 exist.

SUMMARY

Exemplary embodiments of the present invention provide a portable terminal that reduces a size of a bezel portion and impedes liquids from entering into various portions of the portable terminal.

Additional features of the invention will be set forth in the description which follows, and in part will be apparent from the description, or may be learned by practice of the invention.

Exemplary embodiments of the present invention provide a terminal including a window module; a display module disposed below the window module; a housing surrounding the window module and the display module while allowing one surface of the window module to be exposed; and a sealant frame including a first frame and a second frame, the first frame surrounding a portion of the display module, the second frame surrounding a portion of the first frame and a portion of the display module.

Exemplary embodiments of the present invention provide a terminal including a window module; a display module disposed below the window module; a housing surrounding the window module and the display module such that one surface of the window module is exposed; and a sealant frame including a first frame including a first arrangement member disposed in a first axis and a first extension member disposed in a second axis, and a second frame including a second arrangement member disposed in the first axis and a second extension member disposed in the second axis, which the first extension member extends towards the window module and the second extension member overlaps the first extension member and extends away from the window module.

Exemplary embodiments of the present invention provide a terminal including a window module; a display module; a housing surrounding the window module and the display module such that one surface of the window module is exposed; a sealant frame to wrap around the display module; a sealant portion disposed between the display module and the housing in a first axis; and an adhesive disposed on a portion of the sealant frame disposed in a second axis, a portion of the sealant frame disposed in the first axis, and the sealant portion.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be understood that when an element is referred to as being "on" or "connected to" or "contacting" another element, it can be directly on, directly connected to, or directly contacted to the other element, or intervening elements may be present. In contrast, if an element is referred to as being "directly on" or "directly connected to" or "directly contacting" another element, no intervening elements are present. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Figure 2:
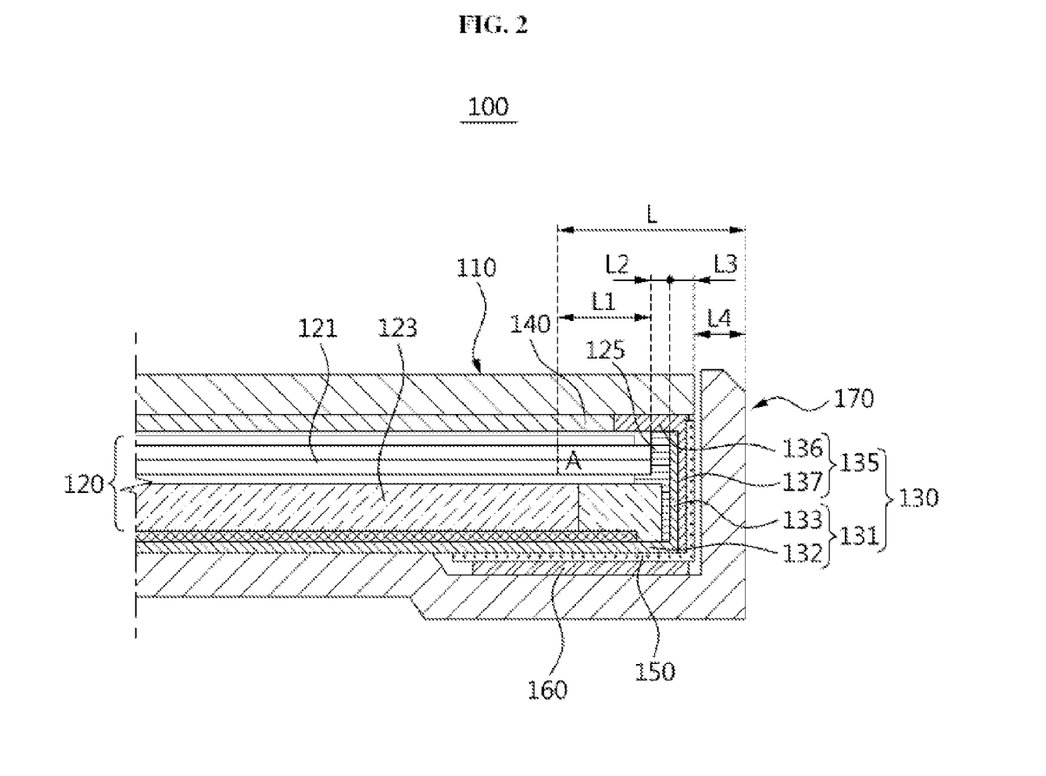
FIG. 2 is a cross-sectional view illustrating a portion of a portable terminal according to an exemplary embodiment of the present invention.

FIG. 2 is a cross-sectional view illustrating a portion of a portable terminal according to an exemplary embodiment of the present invention.

Referring to FIG. 2, the portable terminal 100 includes a window module 110, a liquid crystal display (LCD) module 120 disposed below the window module 110, and a housing 170 surrounding or enclosing the window module 110 and the LCD module 120 such that one surface of the window module 110 is exposed. The portable terminal 100 may further include a sealant portion 160, which is disposed between the LCD module 120 and a side surface of the housing 170 to obstruct or impede external liquids, such as water, for example, from permeating through between the LCD module 120 and the housing 170. Further, the sealant portion 160 may be attached or disposed onto a surface of the housing 170. Although FIG. 2 is described with respect to the LCD module, aspects of the invention are not limited thereto, such that other display modules may be used.

Further describing each configuration, although not illustrated in detail, the window module 110 may include a window glass layer and a touch layer, which may be disposed below the window glass layer. An LCD panel 121 of the LCD module 120 may be disposed below the touch layer. In an example, the window module 110 may be a touch window, which may be provided in a form of a film, such as a touch Indium Tin Oxide (ITO) film.

However, aspects of the invention are not limited thereto, such that the window module 110 may employ other configurations, such as an on-cell structure in which the touch layer is combined on a top surface of the LCD panel 121, an in-cell structure in which the touch layer is combined within the LCD panel 121, a structure in which the touch layer is integrally combined with a bottom surface of the window glass, and the like.

The window glass may use acrylic or tempered glass having an excellent or a reference level of durability, Polycarbonate, and the like. However, aspects of the invention are not limited thereto, such that different materials may be used to form a window.

As illustrated in FIG. 2, the LCD module 120 includes the LCD panel 121, a backlight unit 123 disposed below the LCD panel 121 to emit light toward the LCD panel 121, and a molding member 125 to buffer and support the LCD panel 121 and the backlight unit 123.

Referring to FIG. 2, a sealant frame 130 may be configured to surround various portions of the LCD module 120, including, but not limited to, a lower portion, a side portion, and an upper portion of the LCD module 120. The sealant frame 130 may support the molding member 125, which surrounds the LCD panel 121 and the backlight unit 123. Further, the sealant frame 130 may also provide resistance, impedance, or protection against liquids for the LCD panel 121 and the backlight unit 123.

The LCD panel 121 may have a screen display area capable of displaying an image. The backlight unit 123 may be disposed at a rear portion of the LCD panel 121 to emit light toward the LCD panel 121. Although not illustrated in detail, the backlight unit 123 may include a printed circuit board (PCB) mounted with a lamp, a light guide plate, an optical sheet, a light shielding tape, and the like. Further, the backlight unit 123 may have a structure in which the PCB, the light guide plate, the optical sheet, the light shielding tape, and the like, are multilayered.

Referring to FIG. 2, the sealant frame 130 includes a lower or first frame 131, which surrounds and/or combines with lower portions and side portions of the LCD panel 121 and the backlight unit 123. The sealant frame 130 also includes an upper or second frame 135, which partially surrounds a side portion of the lower frame 131 and an upper portion of the LCD panel 121 to overlap the lower frame 131.

The upper frame 135 and the lower frame 131 may be made using a stainless steel material having an excellent or a reference level of rigidity. Accordingly, the molding member 125 surrounding the LCD panel 121 and the backlight unit 123 may be supported. The lower or first frame 131 includes a first arrangement member 132 and a first extension member 133. The upper or second frame 135 includes a second arrangement member 136 and a second extension member 137. The first arrangement member 132 and the second arrangement member 136 may be configured horizontally and aligned or disposed in a first axis, which is parallel to the axis in which the window module 110 extends, for example, the direction in which a front surface of the window module 110 extends. The first extension member 133 and the second extension member 137 may be configured vertically and aligned or disposed in a second axis, which is perpendicular to an axis in which the window module 110 extends, for example, the direction of the thickness of the window module 110. Further, the first arrangement member 132 may be longer than the second arrangement member 136. However, aspects of the invention are not limited thereto, such that the first portion and the second portion of the upper frame and the lower frame may have different lengths, disposition or configuration based upon orientation and/or design of the portable terminal.

The second arrangement member 136 may contact a portion of the window module 110 and/or the lamination layer 140. The first arrangement member 132 may be in contact with a portion of the backlight unit 123. Further, the first arrangement member 132 may be configured to intersect or be normal to the first extension member 133. The second arrangement member 136 may be configured to intersect or be normal to the second extension member 137.

Referring to FIG. 2, a portion of the LCD panel 121 may be positioned below the second arrangement member 136 of the upper frame 135, and the window module 110 may be positioned above the second arrangement member 136. A lamination layer 140, which may be formed by ultraviolet (UV) lamination, may be disposed between the LCD panel 121 and the window module 110 for lamination of the LCD panel 121 and the window module 110.

The second arrangement member 136 of the upper frame 135 is disposed between the window module 110 and the LCD panel 121. The second arrangement member 136 may remove or be disposed in a gap that may be present between the window module 110 and the LCD panel 121. Accordingly, it may be possible to impede or prevent liquids, such as water, from permeating or passing therebetween.

The lower frame 131 includes a first arrangement member 132, which may be disposed below the backlight unit 123 and a first extension member 133. The first extension member 133 may extend towards the window module 110 from a portion of the first arrangement member 132. Edge portion of the upper frame 135 or the second arrangement member 136 and the first extension member 133 of the lower frame 131 may overlap or intersect to assist in impeding or preventing liquids from permeating or passing through one or more portions of the portable terminal.

Normally, when liquids, such as water, are exposed to the portable terminal, such liquids may permeate or pass between the lower frame 131 and the upper frame 135. To impede or prevent such permeation, an adhesive, such as a one-sided tape 150, may be wrapped around a bottom surface of the lower frame 131 and a side surface of the upper frame 135, the extension member 137 and a bottom surface of the lower frame 131, or the first arrangement member 132. Further, the second extension member 137 may be attached to the second arrangement member 136 of the upper frame 135 and one or more portions of the lower frame 131. Accordingly, it may be possible to impede or prevent liquids, such as water, for example, from penetrating into the LCD module 120 through a space between the upper frame 135 and the lower frame 131.

According to aspects of the invention, it may be possible to impede or prevent liquids from entering between the window module 110 and the LCD module 120 using the upper frame 135 of the sealant frame 130. In addition, it may be possible to connect the upper frame 135 and the lower frame 131 from each other using an adhesive, such as the one-sided tape 150. However, aspects of the invention are not limited thereto, such that the upper frame 135 and the lower frame 131 may be connected using other adhesives or mechanisms. Accordingly, liquids may be impeded or prevented from permeating into one or more portions of the portable terminal 100.

Referring to FIG. 2, the side surface or an edge portion of the window module 110 and the side surface or an edge portion of the LCD module 120 may be attached together using an adhesive, such as the one-sided tape 150. However, aspects of the invention are not limited thereto, such that other adhesives or mechanisms may be used to combine or attach portions of the window module 110 and the LCD module 120. Further, the housing 170, in which the window module 110 and the LCD module 120 are disposed, may have a smooth or planar inner surface as opposed to a grooved or stepped inner surface.

According to aspects of the invention, it may be possible to impede or prevent liquids from entering between the window module 110 and the LCD module 120 using the aforementioned sealant frame 130, and/or by attaching the bottom surface of the LCD module 120 and the side surface of the housing 170 using the sealant portion 160. Accordingly, it may be possible to impede or prevent liquids from permeating or entering into the portable terminal 100. Further, it may be possible to decrease a length L or size of a bezel portion.

Referring to FIG. 2, the sealant portion 160 may be, without limitation, a double-sided tape having double-sided adhesiveness or other adhesives. The sealant portion 160 may be disposed between a bottom surface of the LCD module 120 or the backlight unit 123 and an upper surface of the housing 170, which faces towards interior of the portable terminal. Due to the double-sided attachment structure, even if liquid permeates between the LCD module 120 and the housing 170, the liquid may be impeded or prevented from permeating or passing through between the bottom surface of the LCD module 120 and the upper surface of the housing 170. In addition, a space having a predetermined width for attaching the double-sided tape may not be required for a sidewall portion of the housing 170. Accordingly, it may be possible to reduce a length L or size of the bezel portion of the portable terminal.

According to aspects of the invention, the length L of the bezel portion may be, for example, 2.4 mm that is a sum of 1.2 mm, which may refer to a distance L1 from an edge of an active area A of the LCD module 120 to a side end of the LCD panel 121, 0.2 mm, which may refer to a width L2 of the molding member 125, 0.05 mm, which may refer to an interval (not shown) between the molding member 125 and the sealant frame 130, 0.2 mm, which may refer to a width L3 between the sealant frame 130 and the one-sided tape 150, and 0.75 mm, which may refer to a value L4 obtained by adding up an interval between the one-sided tape 150 and the inner surface of the housing 170 and a width of the housing 170. In comparison, the portable terminal 1 of FIG. 1 may, for example, have a bezel portion length of 4.1 mm for the bezel portion included in the portable terminal 1 of FIG. 1, which may be 1.7 mm longer than the bezel portion length L of 2.4 mm. Accordingly, it may be possible to decrease the length of the bezel portion of the portable terminal when compared to the related art.

As described above, according to aspects of the invention, it may be possible to impede or prevent liquid from permeating or passing through between the window module 110 and the LCD module 120 using the sealant frame 130 provided in the LCD module 120. Further, using the sealant portion 160, it may be possible to impeded or prevent liquid from permeating or passing through between the LCD module 120 and the housing 170. By decreasing the length of the bezel portion of the portable terminal when compared against the related art, it may be possible to enlarge an active area of an LCD while maintaining the same overall size of the portable terminal.

Also, when compared to the conventional portable terminal, it may be possible to decrease the length of the bezel portion while maintaining or enlarging the screen size. Accordingly, it may be possible to maintain portability and a sensation of grip while enhancing aesthetics.

The aforementioned exemplary embodiment describes the upper frame 135 and the lower frame 131 of the sealant frame 130 being separately provided whereby the lower frame 131 may be combined with the LCD module 120 and the upper frame 135 may partially overlap a sidewall portion of the lower frame 131. However, aspects of the invention are not limited thereto, such that a flattened U-type sealant frame (not shown) in which an upper frame and a sidewall portion of a lower frame may be integrally formed to be combined with the LCD module 120. To integrally form the upper frame and the lower frame, the sealant frame may be integrally configured using spot welding and the like by eliminating the upper frame or the sidewall portion of the lower frame. However, methods for manufacturing the integrated sealant frame are not limited to this example.

Figure 3:
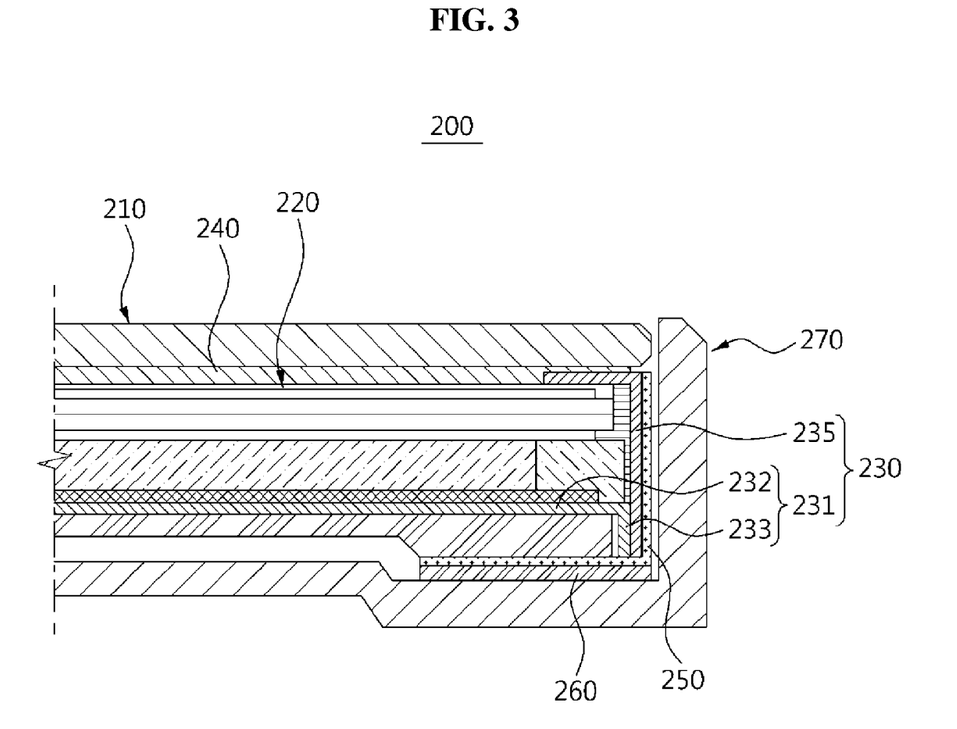
FIG. 3 is a cross-sectional view illustrating a portion of a portable terminal according to an exemplary embodiment of the present invention.

FIG. 3 is a cross-sectional view illustrating a portion of a portable terminal according to an exemplary embodiment of the present invention.

Referring to FIG. 3, a sealant frame 230 of the portable terminal 200 of FIG. 3 may have a structure different from the sealant frame 130 of FIG. 2.

The sealant frame 230 of an LCD module 220 may include a lower frame 231 and an upper frame 235. Here, an extension member 233, which may be extended from a lower arrangement member 232 of the lower frame 231, may be extended to be downward instead of being upward.

A portion of the upper frame 235 may be formed to partially overlap the extension member 233 of the lower frame 231. Further, a one-side tape 250 may be attached or disposed between the upper frame 235 and the lower frame 231 by enabling a lower end portion of the upper frame 235 to partially overlap a lower end portion of the extension member 233 of the lower frame 231 and by matching positions of lower ends thereof.

A lamination layer 240 may be disposed between the upper frame 235 and a window module 210 to provide some protection or impedance against liquids from reaching the LCD module 220. Further, the one-sided tape 250 may be attached to portions of the lower frame 231 and the upper frame 235 to provide some protection or impedance against liquids.

Further, the sealant portion 260 may be disposed between the one-sided tape 250 and an upper surface of a housing 270 to impede or prevent liquid from permeating between the one-side tape 250 and the housing 270. Here, the one-sided tape may provide impedance or protection against liquids from permeating between the lower frame 231 and the upper frame 235. The sealant portion 260 may have a width that reaches an outer side of the one-sided tape 250, thereby providing impedance or protection against liquids, such as water, from permeating between the LCD module 220 and the housing 270.

Although not illustrated, a groove (not shown) may be formed on the interior surface of the housing 270 so that portions of the lower frame 231 and the upper frame 235 of the sealant frame 230 may be at least partially inserted in the groove. If the housing 270 includes such an insertion structure, the width of the sealant portion 260 may be formed to be shorter than those included in the housing without such insertion structure.

According to aspects of the invention, it may be possible to attach the one-sided tape 250 using the structure of the sealant frame 230 and to enhance assembly efficiency. Also, it may be possible to provide impedance and/or protection against liquids and decrease a length of a bezel portion. Accordingly, it may be possible to further enlarge an active area while maintaining the same overall size of the portable terminal.

Figure 4:
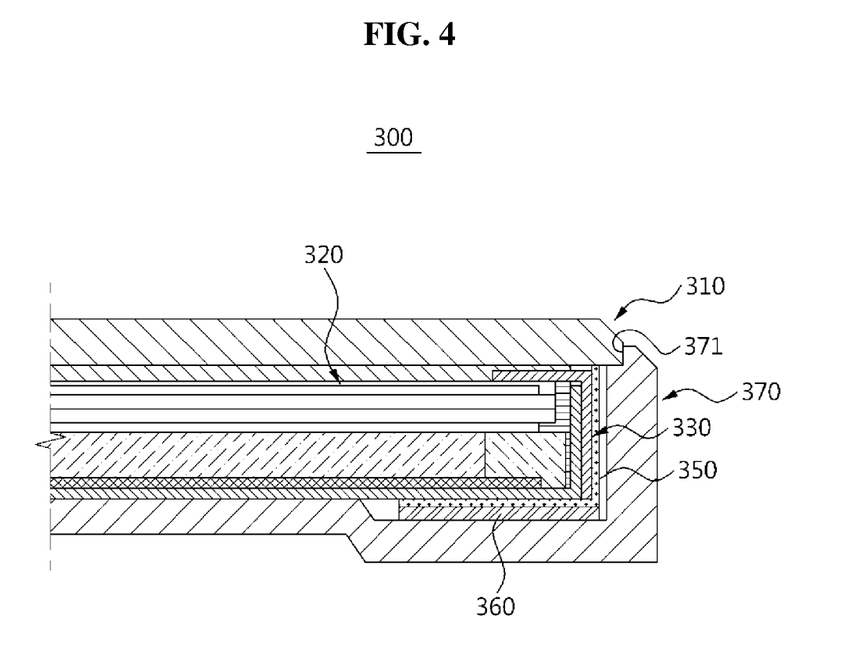
FIG. 4 is a cross-sectional view illustrating a portion of a portable terminal according to an exemplary embodiment of the present invention.

FIG. 4 is a cross-sectional view illustrating a portion of a portable terminal 300 according to an exemplary embodiment of the present invention.

Referring to FIG. 4, a support step 371 is provided on an upper end of a sidewall of a housing 370 to strengthen a bonding force between the window module 310 and the housing 370. An edge portion of a window module 310 may be engaged and combined with the support step 371.

The window module 310 may be larger than the window module 110 of FIG. 2 and the window module 210 of FIG. 3. The window module 310 may be combined with the housing 370 by forming the support step 371 on the upper end of the sidewall of the housing 370.

For example, a 2.5D-machined window glass of which edge is round processed, or a 3D-machined window glass that is entirely round processed, a housing may be positioned below the window glass instead of surrounding the edge of the window glass according on a shape of the window glass. Further, when applying a sealant structure, an external impact may be transferred to an LCD panel of an LCD module 320. To mitigate against this, an edge of the window glass may be configured to be supported or reinforced by the support step 371. Thus, it may be possible to relieve the external impact and to reduce such impact being transferred to the LCD panel.

Also, according to aspects of the invention, it may be possible to provide resistance against liquids from entering into the portable terminal using a sealant frame 330, a double-sided tape 350, and a sealant portion 360. In addition, it may be possible to decrease a length or size of a bezel portion, and to further enlarge an active area while maintaining the same overall size of the portable terminal.

Hereinafter, a portable terminal according an exemplary embodiment of the present invention will be described based on a portion different from the aforementioned exemplary embodiments.

Figure 5:
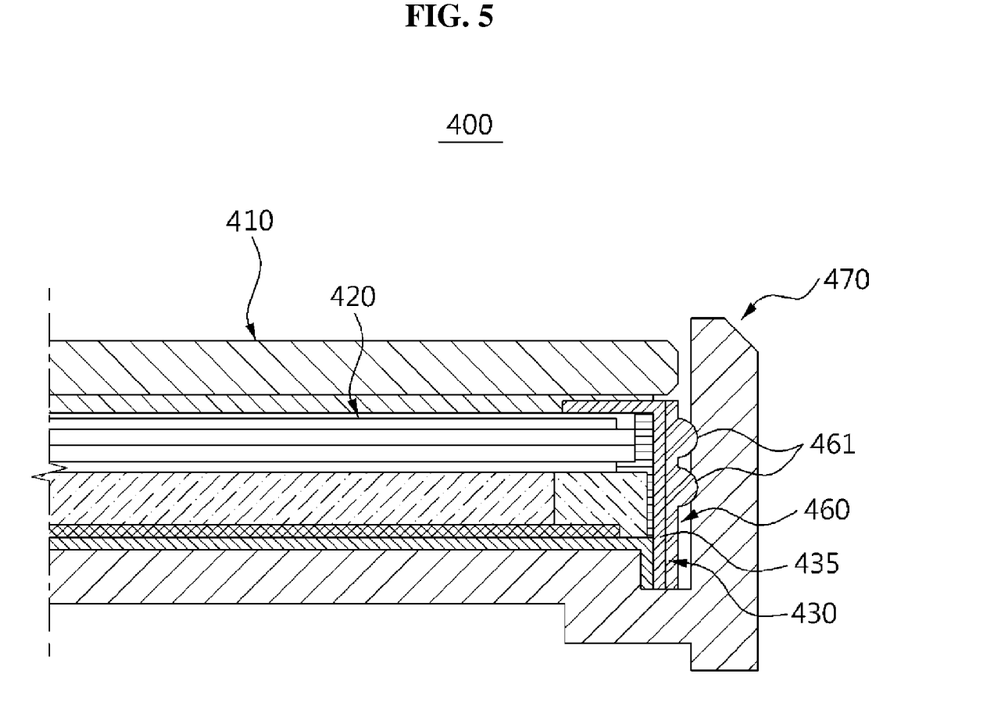
FIG. 5 is a cross-sectional view illustrating a portion of a portable terminal according to an exemplary embodiment of the present invention.

FIG. 5 is a cross-sectional view illustrating a portion of a portable terminal according to an exemplary embodiment of the present invention.

Referring to FIG. 5, a sealant portion 460 of the portable terminal 400 may also be referred to as a rubber sidewall, which may be integrally formed with or disposed on a side portion of an LCD module 420 through insert injection molding. The rubber sidewall may include a protruding portion 461 protruded from the LCD module 420 toward an inner surface of a sidewall portion of a housing 470. The protruding portion 461 may be tied along the circumference of the rubber sidewall 460 to be in a form of a band.

Specifically describing, the rubber sidewall 460 may be integrally formed with an upper frame 435 of a sealant frame 430 through insert injection molding. Accordingly, it may be possible to impede or prevent liquid from penetrating into the LCD module 420. Also, the protruding portion 461 formed on the rubber sidewall 460 may include two protrusions as shown in FIG. 5, however, aspects need not be limited thereto such that the protruding portion 461 may only include one protrusion or three or more protrusions. The protruding portion 461 may maintain a tight contact state with the housing 470 using elastic force. Accordingly, it may be possible to impede or prevent liquids from permeating between the protruding portion 461 and an inner side surface of the housing 470.

More specifically, the aforementioned exemplary embodiments describe various sealant structures or configurations that may be provided between a window module and an LCD module and between an upper frame and a lower frame of a waterproof frame. Referring to exemplary embodiment of FIG. 4, protection or resistance against liquids may be provided between a window module 410 and the LCD module 420 and between the protruding portion 461 and the housing 470.

As described above, according to aspects of the invention, by integrally forming the upper frame 435 and the rubber sidewall 460, it may be possible to further facilitate assembly. Also, by providing the rubber sidewall 460 in a form of a thin sidewall, it may be possible to decrease a length of a bezel portion and to further enlarge an active area while maintaining the same size of the portable terminal.

According to exemplary embodiments of the present invention, it may be possible to provide resistance or impedance against liquids from permeating into one or more portions of the portable terminal. At the same, it may be possible to increase a screen size by decreasing a size of a bezel portion compared to a conventional portable terminal.

Also, according to aspects of the invention, it may be possible to decrease a length or size of a bezel portion while maintaining or increasing a screen size. Accordingly, it may be possible to enhance portability, a sensation of grip, visibility, and/or aesthetics.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising:
a window module;
a display module disposed below the window module;
a housing surrounding the window module and the display module while allowing one surface of the window module to be exposed; and
a sealant frame comprising a first frame and a second frame comprising a second arrangement member disposed between the display module and the window module, the first frame surrounding a portion of the display module, the second frame comprising a second extension member surrounding a portion of the first frame, the second arrangement member extending from the second extension member of the second frame.

2. The terminal of claim 1, further comprising:
a sealant portion disposed between the display module and a surface of the housing.

3. The terminal of claim 1, wherein at least one of the first frame and the second frame comprises stainless steel.

4. The terminal of claim 1, wherein an interior surface of the housing is a planar surface.

5. The terminal of claim 1, wherein an interior surface of the housing comprises a groove or a step.

6. The terminal of claim 1, wherein the first frame comprises a first arrangement member disposed in a first axis and a first extension member disposed in a second axis, and wherein the second arrangement member is disposed in the first axis and the second extension member is disposed in the second axis.

7. The terminal of claim 6, wherein the second arrangement member is disposed closer to the window module than the first arrangement member.

8. The terminal of claim 6, wherein the first extension member is longer than the second extension member.

9. The terminal of claim 6, wherein the first extension member extends toward the window module.

10. The terminal of claim 6, wherein the first extension member extends away from the window module.

11. The terminal of claim 6, wherein an adhesive is disposed on a surface of the first arrangement member and disposed on a surface of the second extension member.

12. The terminal of claim 11, wherein the adhesive does not contact a surface of a sidewall portion of the housing disposed in the second axis.

13. The terminal of claim 11, wherein the adhesive is a one-sided tape.

14. The terminal of claim 6, wherein the first extension member overlaps the second extension member.

15. The terminal of claim 1, wherein the window module overlaps the display module but not a sidewall portion of the housing disposed in the second axis.

16. The terminal of claim 1, wherein the window module overlaps the display module and a portion of the housing, and
wherein the housing comprises a support step on which the window module is disposed.

17. The terminal of claim 1, further comprising a rubber sidewall disposed between a sidewall portion of the housing disposed in the second axis.

18. The terminal of claim 17, wherein the rubber sidewall has at least one protruding portion that contacts a surface of the sidewall portion of the housing.

19. A terminal, comprising:
a window module;
a display module disposed below the window module;
a housing surrounding the window module and the display module such that one surface of the window module is exposed; and
a sealant frame comprising:
a first frame comprising a first arrangement member disposed in a first axis and a first extension member disposed in a second axis; and
a second frame comprising a second arrangement member disposed in the first axis and a second extension member disposed in the second axis,
wherein the first extension member extends towards the window module and the second extension member overlaps the first extension member and extends away from the window module, and
wherein the second arrangement member is disposed between the window module and the display module.

20. A terminal, comprising:
a window module;
a display module;
a housing surrounding the window module and the display module such that one surface of the window module is exposed;
a sealant frame configured to wrap around the display module, the sealant frame comprising a first sealant portion disposed between the display module and the housing in a first axis and a second sealant portion extending from the first sealant portion, the second sealant portion facing an inner side surface of the housing; and an adhesive disposed on the first sealant portion and the second sealant portion, the adhesive disposed on the second sealant portion being disposed between the second sealant portion and the inner side surface of the housing.

* * * * *